(12) United States Patent
Barturen

(10) Patent No.: US 8,555,021 B1
(45) Date of Patent: Oct. 8, 2013

(54) SYSTEMS AND METHODS FOR AUTOMATING AND TUNING STORAGE ALLOCATIONS

(75) Inventor: Txomin Barturen, Issaquah, WA (US)

(73) Assignee: EMC Corporation, Hopkinton, MA (US)

( * ) Notice: Subject to any disclaimer, the term of this patent is extended or adjusted under 35 U.S.C. 154(b) by 1421 days.

(21) Appl. No.: 11/536,850

(22) Filed: Sep. 29, 2006

(51) Int. Cl.
*G06F 12/00* (2006.01)

(52) U.S. Cl.
USPC ........... 711/170; 711/202; 711/156; 711/114; 711/E12.001

(58) Field of Classification Search
USPC .................... 711/170, 156, 114, 202, E12.001
See application file for complete search history.

(56) References Cited

U.S. PATENT DOCUMENTS

| | | | |
|---|---|---|---|
| 7,058,772 B2 * | 6/2006 | Kuwabara et al. | 711/159 |
| 7,065,624 B1 * | 6/2006 | Zahavi | 711/170 |
| 7,111,088 B2 * | 9/2006 | Kawasaki et al. | 710/38 |
| 7,216,263 B2 * | 5/2007 | Takaoka et al. | 714/47 |
| 7,392,365 B2 * | 6/2008 | Selkirk et al. | 711/202 |
| 7,409,470 B2 * | 8/2008 | Halstead et al. | 710/32 |
| 2002/0129049 A1 * | 9/2002 | Collins et al. | 707/500 |
| 2003/0236884 A1 * | 12/2003 | Yamamoto et al. | 709/225 |
| 2005/0108477 A1 * | 5/2005 | Kawasaki et al. | 711/114 |
| 2007/0079097 A1 * | 4/2007 | Karnowski et al. | 711/170 |

* cited by examiner

*Primary Examiner* — Pierre-Michel Bataille
(74) *Attorney, Agent, or Firm* — Muirhead and Saturnelli, LLC

(57) ABSTRACT

Methods and systems are disclosed that relate to identifying an appropriate logical unit for a requested application storage allocation. An exemplary method includes receiving a request for storage allocation comprising a plurality of storage attributes including capacity and at least one performance and/or availability criterion. The method further includes identifying a logical unit having at least one designated storage characteristic that satisfies the at least one criterion and having an available storage space that satisfies the capacity and allocating at least a portion of the identified logical unit for storage associated with the request.

18 Claims, 5 Drawing Sheets

SYSTEMS AND METHODS FOR AUTOMATING AND TUNING STORAGE ALLOCATIONS

BACKGROUND

Different applications using a single data storage system may have different performance and/or availability requirements for the associated storage. Each application, typically run on a host, may have different capacity, performance, and/or availability requirements for storage allocated to it on the data storage system. A data storage system, which may include one or more arrays of data storage devices, generally does not receive performance and/or availability requirements for individual host applications using its storage devices.

Data storage systems may run programs, or tools, to "optimize" storage within the array. One such optimization tool is the SYMMETRIX OPTIMIZER tool, available from EMC Corporation of Hopkinton, Mass. This tool measures the usage of specific components of a SYMMETRIX storage system, also available from EMC Corp. The tool seeks to identify highly utilized components of the storage system so that the load on components within the storage system can be balanced. For example, the tool may measure the number of I/O requests handled by each physical device, or spindle, within the data storage system per unit of time. The tool uses such measurements to make decisions regarding how storage should be allocated or configured. The program may migrate data to other physical devices on the storage system in an effort to optimize overall system performance. For example, when one component is highly utilized, the tool may move selected data from that component to another component that is less utilized. To maintain the integrity of the storage for the application, the storage characteristics of the target component—including capacity, performance, availability, and RAID level—must match or exceed the storage characteristics of the source component.

The AutoRAID tool, available from Hewlett Packard, is another tool that can be used to optimize storage within a data storage system. The AutoRAID tool can change the RAID level of devices in the data storage system to improve the performance of the data storage system.

Data storage systems may also run tools that monitor the quality of service of the data storage system and make adjustments to maintain the specified level of service. These tools attempt to maintain the quality of service by managing the priority of operations in the data storage system and I/O requests from hosts using the system.

SUMMARY OF EXEMPLARY EMBODIMENTS

The inventor of the present invention recognized that known optimization tools for data storage systems may not actually result in the storage performance and/or availability appropriate for one or more associated host applications. The inventor of the present invention recognized that, in addition to storage capacity, the performance and/or availability criteria for a host application can be useful information for optimization of a data storage system. The inventor of the present invention further recognized that the performance and/or availability criteria for a host application can be used to ensure that a data storage system satisfies the specific storage needs of host applications using the system over time.

Methods and systems are disclosed that relate to identifying an appropriate logical unit for a requested application storage allocation. One embodiment consistent with principles of the invention is a method for selecting a logical unit for a requested storage allocation. The method includes receiving a request for storage allocation comprising a plurality of storage attributes including capacity and at least one criterion selected from the group consisting of performance and availability criteria. A logical unit having at least one designated storage characteristic that satisfies the at least one criterion and having an available storage space that satisfies the capacity is identified in the storage array. The identified logical unit, or a portion thereof, is allocated for storage associated with the request.

Another embodiment consistent with the principles of the invention is a method for enabling identification of a logical unit in a storage array for storage allocation. The method includes enabling the identification of a capacity for the storage allocation and enabling the selection of at least one performance and/or availability criteria. A request for storage allocation including the capacity and at least one criterion is created.

Either of the foregoing embodiments can be implemented in computer readable program code. Such code can be stored on a computer usable medium. Such code can also be executed on a system, which may include data storage system or have an associated data storage system.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings.

Figure 1:
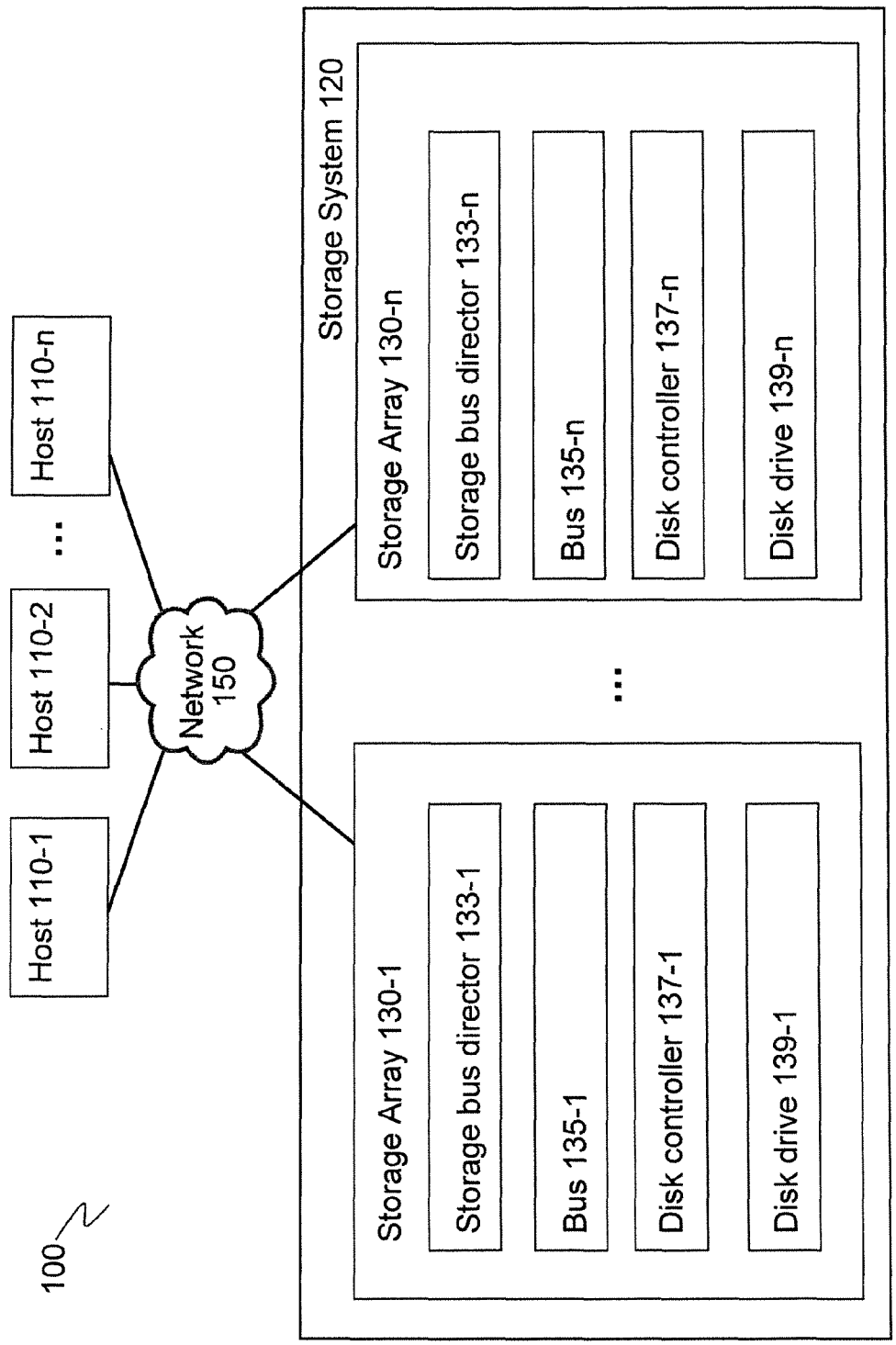
FIG. 1 illustrates an exemplary computer system consistent with features and principles of the present invention.
Figure 2:
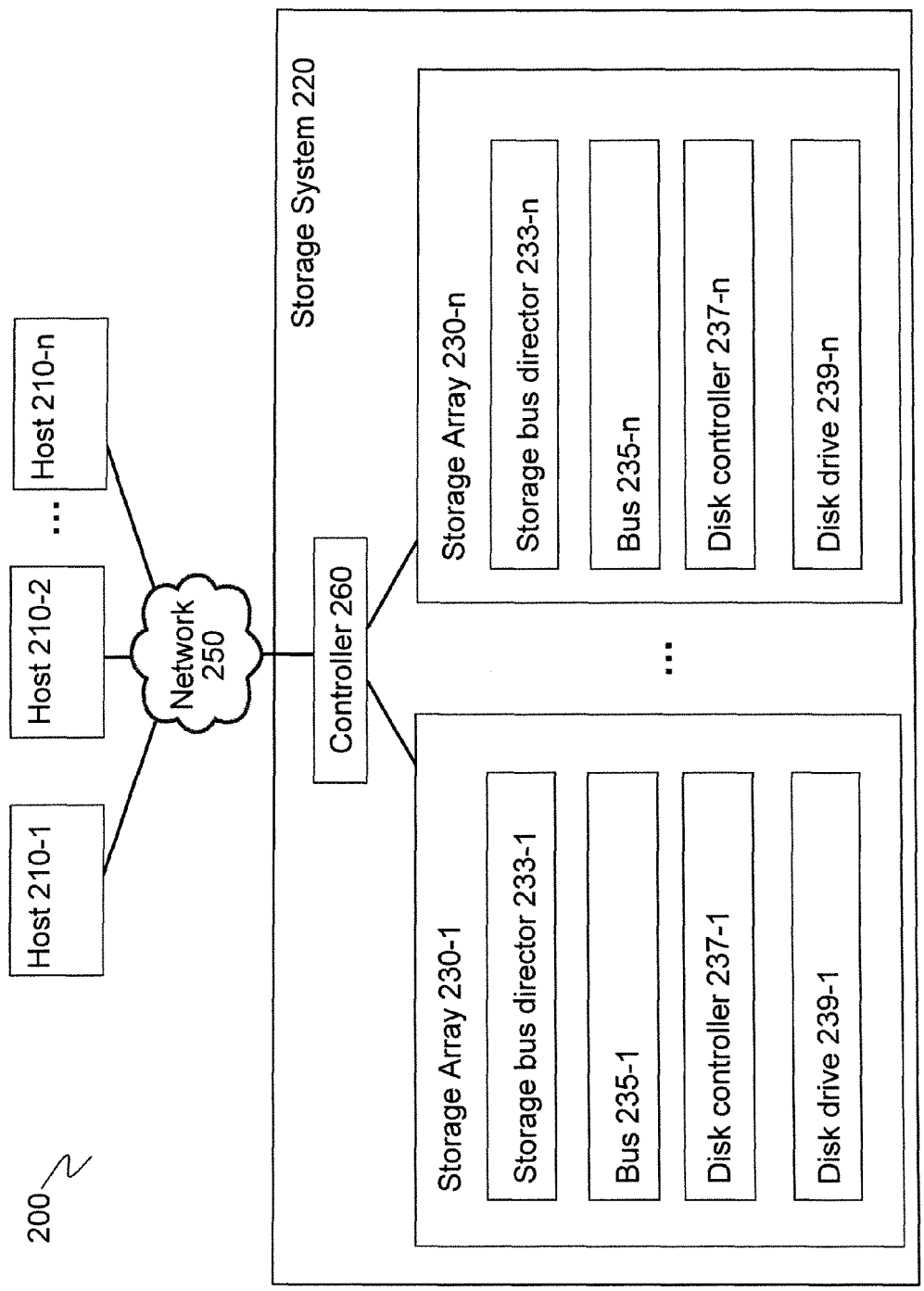
FIG. 2 also illustrates an exemplary computer system consistent with features and principles of the present invention.

FIG. 1 and FIG. 2 illustrate exemplary computer systems 100 and 200 in which the invention can be implemented. FIG. 1 illustrates computer system 100, which includes at least one host 110 connected via a network 150 to a storage system 120. Storage system 120 serves the I/O requests of host 110 via network 150. Each host 110-1, 110-2, ..., 110-n is a device capable of running machine readable code and of transmitting data to and receiving data from storage system 120 via network 150. Host 110 generally has one or more user interfaces such as a keyboard and/or mouse for data input and a monitor. Host 110 can be a personal computer or a server.

Network 150 enables communication between each host 110 and storage system 120. If storage system 120 includes more than one storage array 130, network 150 can enable each host 110 to communicate directly with each storage array 130. Network 150 may be implemented with physical cabling such as copper wire or fiber, with wireless communication devices, or with a combination of the foregoing.

A storage system may include a single persistent memory storage device, such as a single disk drive 139-1; or a group of persistent memory storage devices, such as storage array 130-1. Storage system 120 includes multiple storage arrays 130-1, . . . , 130-n. Storage array 130-1 includes a bus 135-1, a storage bus director 133-1, at least one disk controller 137-1 and at least one disk drive 139-1. Each storage bus director 135-1 controls communication between storage array 130-1 and other components on network 150. Each disk controller 137-1 typically controls access to a plurality of disk drives 139-1. Storage bus director 133-1, disk controller 137-1, and disk drive 139-1 communicate over bus 135-1. Different disk drives in an array may have different storage characteristics, including storage capacities, performance and availability ratings, and RAID levels.

FIG. 2 illustrates computer system 200, which includes at least one host 210 connected via a network 250 to storage system 220. Computer system 200 differs from computer system 100 in that network 250 enables communication between host 210 and a controller 260 in storage system 220. Controller 260 in turn communicates with each of storage array 230-1, 230-2, . . . , 230-n in storage system 220. Accordingly, controller 260 manages storage system 220. Controller 260 can be, for example, an INVISTA system, which includes the INVISTA application (offered by EMC Corp. of Hopkinton, Mass.) running on a storage and switch controller coupled to an intelligent multi-protocol switch.

Figure 3:
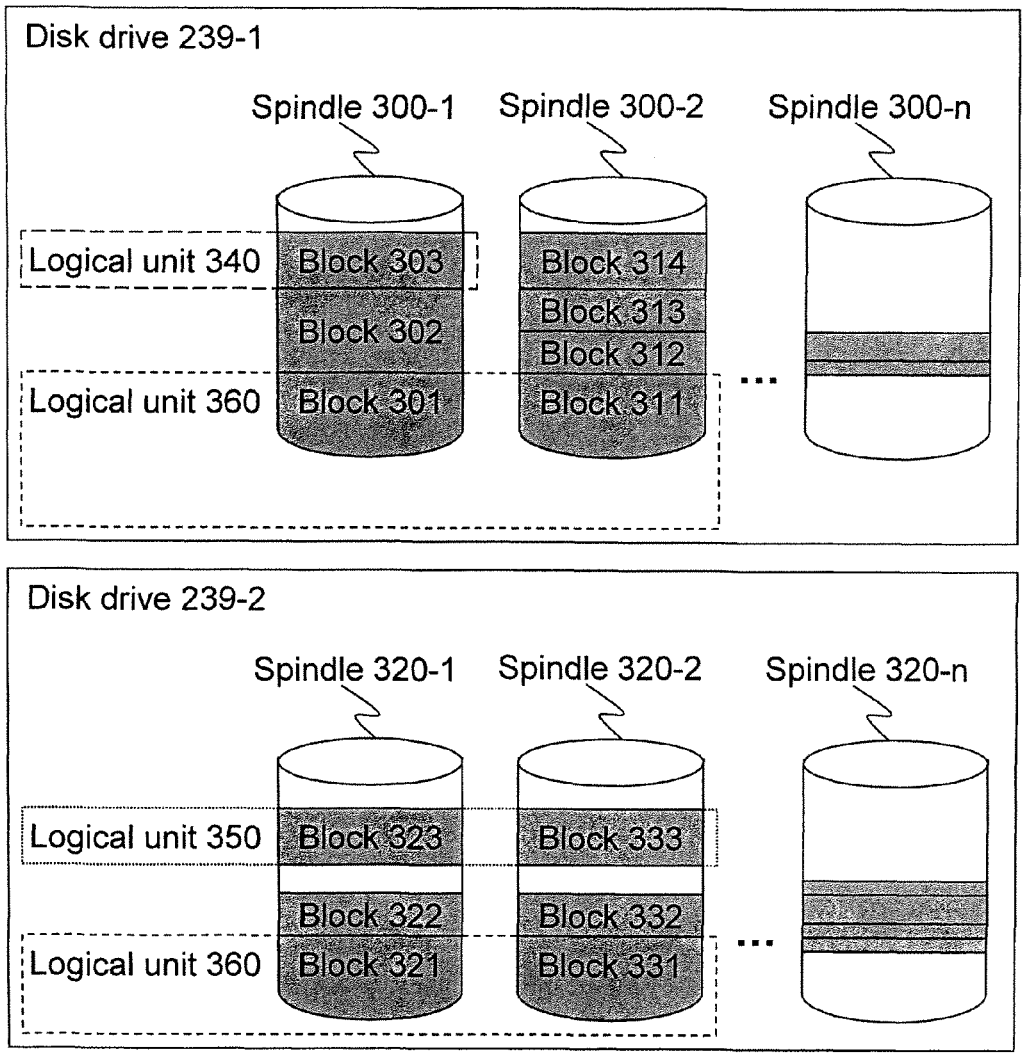
FIG. 3 illustrates an exemplary logical volumes consistent with features and principles of the present invention.

FIG. 3 illustrates exemplary relationships between logical units and physical storage media. A logical unit is persistent storage on one or more physical storage media presented to a host as a single storage capacity with a single identifier and a single set of storage characteristics. The host, therefore, may not be aware of the physical location of data it stores on a logical unit or whether the logical unit is made up of storage capacity from one or more disk drives.

Examples of physical storage media are disk drives 239-1 and 239-2 shown in FIG. 3. A disk drive may have one or more spindles, which are hardware devices containing persistent storage capacity. Spindles may be partitioned into blocks of equal or different storage capacity. For example, spindle 300-2 is partitioned into block 311, block 312, block 313, and block 314, each having different storage capacity. The simplest example of a logical unit is logical unit 340, which is made up of only a single block 303 on a single spindle 300-1 in a single disk drive 239-1. A more complex example is logical unit 350, which is made up of block 323 and block 333 located on different spindles within a single disk drive 239-2. Blocks that are used to form a single logical unit may have different capacities and different storage characteristics. A block within a single logical unit may be backup data for other blocks in the logical unit or additional storage capacity. For example, logical unit 350 may be presented to the host as 3 GB of storage capacity where block 323 is 1.5 GB of storage capacity and block 333 is an additional 1.5 GB of storage capacity. Alternatively, logical unit 350 may be presented to the host as 1.5 GB of storage capacity where block 333 is a mirror of block 323. Logical unit 360 is made up of blocks 301 and 311 on disk drive 239-1 and blocks 321 and 331 on disk drive 239-2. The blocks on disk drive 239-2 included in logical unit 360 may be mirrors of blocks on disk drive 239-1 included in logical unit 360 or they may be additional storage capacity.

Figure 4:
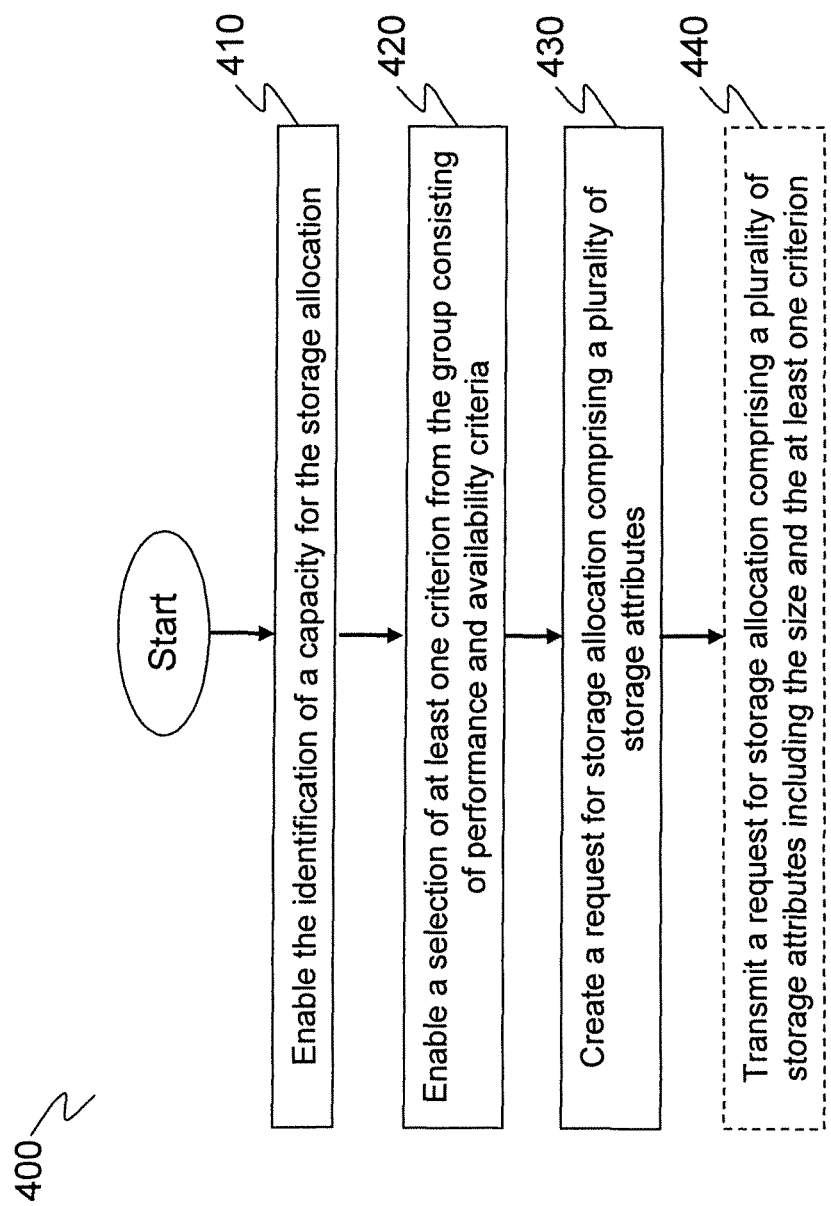
FIG. 4 illustrates an exemplary method for enabling identification of a logical unit in a storage array for a storage allocation.

FIG. 4 illustrates an exemplary method 400 for enabling identification of a logical unit in a storage array for a storage allocation associated with a specific application. Method 400 may be implemented, for example, on host 210-1. A user of host 210 may be presented with an interface to a computer readable code that uses method 400 for requesting an allocation of storage in storage system 220 for an application run on host 210-1. In stage 410, host 210-1 enables the identification of a capacity for the storage allocation. In particular, computer readable program code can display a GUI that enables a storage capacity to be entered. Generally, a user can identify a storage capacity, for example, by selecting from among a list of possible storage capacities or by simply entering a storage capacity. In stage 420, host 210-1 enables the selection of at least one performance and availability criteria. In particular, computer readable program code can display a GUI that enables one or more performance and availability criteria to be selected. Based on the application's requirements and/or the user's additional requirements, the user inputs the capacity for the storage allocation needed as well as the performance and availability criteria desired.

In stage 420, a user may be presented with one or more performance and availability criteria for selection. For instance, host 210-1 may present the user with a choice of RAID level or the ability to specify the RAID level. Alternatively, host 210-1 may present the user with a generalized category, such as a tier, that groups some or all of the performance and availability criterion together for selection. Tier 1 storage, for example, may require synchronized storage of a copy of the data in a remote location. An application for a stock exchange may require tier 1 storage. Tier 2 storage, similarly, might require asynchronous storage of a copy of data in a remote location with a 1 minute batch lag. Tier 4 storage, similarly, might require accessibility within 5 minutes and no remote copy. Email for personal use may only require tier 4 storage. The criteria for each tier may be fixed by an administrator based on the available types of storage in the storage system. Performance criteria may include, for example, a maximum time to respond to an I/O request, the amount of data loss that is acceptable during transmissions or storage, RAID level, and/or the type of spindle used in the logical unit such as Low Cost Fibre Channel (LCFC) or Serial ATA (SATA). Availability criteria may include, for example, a recovery time objective (the acceptable duration for recovery when data access is prevented), a recovery point objective (the lag between the primary and remote storage that is tolerable), or a type of remote replication such as synchronous or asynchronous. The interface for selection may be in checkboxes, lists, free-form fields, binary selections or any other method of selection.

In stage 430, host 210 creates a request for storage allocation. The request for storage allocation includes a plurality of storage attributes, including the identified capacity and the selected criterion or criteria. If a selected criterion represents a group of storage characteristics, such as a tier of storage, the request can contain each of the characteristics of the group. In stage 440, a request can be transmitted from the host 210-1 to the storage system 220 through network 250. The request for storage allocation can be transmitted as one or more packets through network 250.

The GUI of stage 420 can also provide the user with the ability to modify criteria for a previously allocated storage capacity associated with an application. This feature can enable a user to address the situation in which his storage requirements for an application have changed. Requirements can change, for example, when a user moves to a new application to serve a particular purpose but wants to maintain the data associated with the old application. A new or modified request can be transmitted from the host 210-1 to the storage system 220 through network 250 in stage 440. Storage system 220 may use method 500 described in FIG. 5 to respond to the request.

Figure 5:
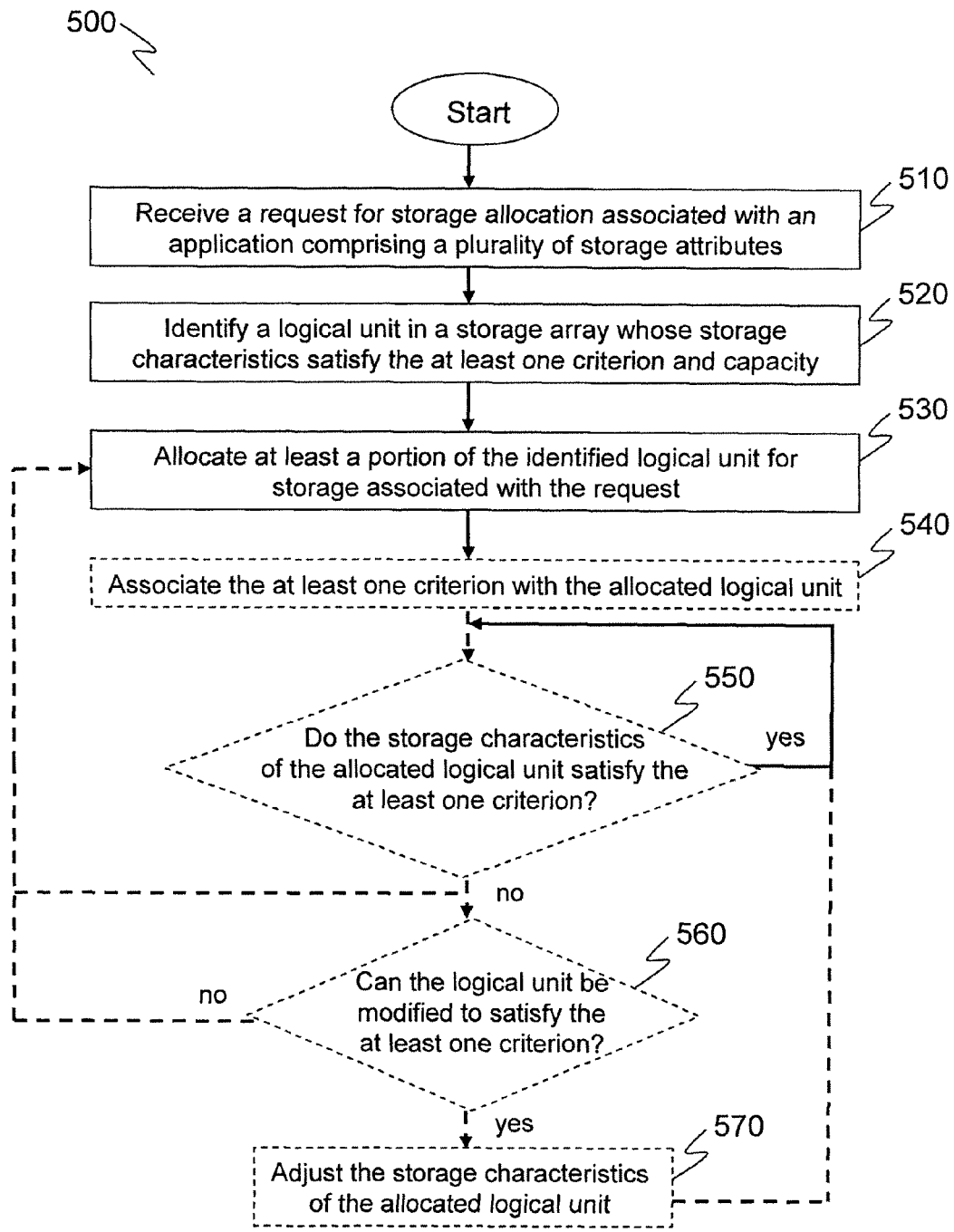
FIG. 5 illustrates an exemplary method for selecting a logical unit for a storage allocation request.

FIG. 5 illustrates method 500, an exemplary method for selecting a logical unit for a requested application storage allocation. Method 500 can be implemented, for example, in storage bus director 233 or controller 260 of computer system 200. The following description of method 500 presumes it is implemented in controller 260.

Method 500 includes three basic stages: stages 510, 520, and 530. In stage 510, a request for storage allocation comprising a plurality of storage attributes is received. In stage 520, a logical unit that satisfies the plurality of storage attributes in the request is identified. The logical unit can be identified from among those in a single storage array. Alternatively, the logical unit can be identified from among those in a plurality of storage arrays. Still alternatively, the logical unit may not be physically associated with a single storage array. The identified logical unit must have designated storage characteristics that meet or exceed the requested capacity and other criterion or criterion. At stage 520, the logical unit is not yet allocated for storage. In stage 530, at least a portion of the identified logical unit is allocated for storage associated with the request.

For example, in stage 510, controller 260 receives a request for an application storage allocation with 1 GB of storage space and X, Y, Z designated storage characteristics. If logical unit 340 has at least 1 GB of available storage space and X, Y, Z designated storage characteristics, logical unit 340 may be identified in stage 520. If no logical unit can satisfy the request, an error message may be returned to the user or an alternative suggestion of storage that is available may be returned to the user. When a logical unit is identified, the user may be asked in stage 530 if they want to allocate at least a portion of the identified logical unit for storage associated with the request. The user may be given a choice of identified logical units that satisfy the request and asked to select from among them. Alternatively, in stage 530, at least a portion of the identified logical unit is automatically allocated for storage associated with the request. In this example, 1 GB of storage space on logical unit 340, which may include the entire storage capacity of logical unit 340, may be allocated for storage associated with the application in stage 530.

Some embodiments of method 500 include one or more additional stages. In stage 540, the at least one criterion is associated with the allocated logical unit. In stage 550, controller 260 checks if the actual storage characteristics of allocated logical unit 340 are satisfying the at least one criterion. The actual storage characteristics of the allocated logical unit can be checked periodically, continually, intermittently, cyclically, and/or by request to determine if they satisfy the at least one criteria. For example, if a minimum latency requirement is a criterion included in the request received in stage 510, controller 260 in stage 550 may continually check the dynamic performance characteristics of the allocated logical unit using a cyclical process. If the logical unit is overloaded or experiencing a problem, it may not satisfy the criterion. In another example, if a recovery point objective is a criterion included in the request received in stage 510, controller 260 in stage 550 may periodically check if the recovery point objective is met. If an infrastructure problem occurs, such as a link between arrays failing or becoming unavailable, the logical unit may be unable to satisfy the recovery point objective.

If the criteria are not satisfied, one embodiment of method 500 returns to stage 520 and identifies a second logical unit to satisfy the request. Another embodiment of method 500 moves to stage 560 in which controller determines if logical unit 340 can be modified to satisfy the at least one criterion. If logical unit 340 can be modified to satisfy the at least one criterion, the storage characteristics may be adjusted in stage 570 to satisfy the at least one criterion. For example, the RAID level or the I/O priority of logical unit 340 may be adjusted. If the storage characteristics of logical unit 340 could not be modified to satisfy the at least one criterion, a new logical unit could be allocated by returning to stage 520. Alternatively, if a physical problem has occurred, such as a link between arrays failing, an indicator could be issued to notify the user of the need for physical repair.

One of ordinary skill in the art will appreciate that features and principles of the present invention may be implemented in a computer-readable medium (e.g., floppy disk, CD-ROM, storage device, etc.) containing instructions, which may be executed by a storage system or host. One of ordinary skill in the art will also appreciate that features and principles of the present invention may be implemented in different elements of a storage system or host.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for selecting a logical unit for a requested application storage allocation, comprising:
   receiving a request for storage allocation having a plurality of storage attributes including a capacity and at least one criterion selected from the group consisting of performance and availability criteria;
   identifying whether a first existing logical unit in a storage array exists having at least one designated storage characteristic that satisfies the at least one criterion and having an available storage space that satisfies the capacity;
   where the first existing logical unit does not exist, identifying a second existing logical unit in the storage array that has the available storage space that satisfies the capacity and is modifiable to satisfy the at least one criterion, and modifying the second existing local unit to satisfy the at least one criterion; and
   allocating at least a portion of the identified first or second existing logical unit for storage associated with the request.

2. The method of claim 1 further comprising:
   associating the at least one criterion with the allocated logical unit.

3. The method of claim 2 further comprising:
   checking the allocated logical unit to confirm that its actual storage characteristics satisfy the at least one criterion.

4. The method of claim 3 further comprising:
   if the allocated logical unit does not satisfy the at least one criterion, adjusting the designated storage characteristics of the allocated logical unit.

5. The method of claim 1 wherein the availability criterion are selected from the group consisting of uptime, recovery time, and recovery point.

6. The method of claim 1 wherein the availability criterion are selected from the group consisting of ability to support replication and RAID level.

7. The method of claim 1, wherein the request for storage allocation is generated according to a first requesting application, wherein the first existing logical unit and the second existing logical unit include non-available storage space already being used for storage in connection with storage allocation for a second requesting application.

8. A method for enabling identification of a logical unit in a storage array for an application storage allocation, comprising:
    enabling an identification of a capacity for the storage allocation;
    enabling a selection of at least one criterion from the group consisting of performance and availability criteria;
    creating a request for storage allocation of an existing logical unit, the request having a plurality of storage attributes including the capacity and the at least one criterion;
    identifying whether a first existing logical unit in the storage array exists having at least one designated storage characteristic that satisfies the at least one criterion and having an available storage space that satisfies the capacity; and
    where the first existing logical unit does not exist, identifying a second existing logical unit in the storage array that has the available storage space that satisfies the capacity and is modifiable to satisfy the at least one criterion, and modifying the second existing local unit to satisfy the at least one criterion.

9. The method of claim 8 further comprising:
    transmitting the request for storage allocation.

10. The method of claim 8 further comprising:
    identifying the capacity for storage allocation by specifying a numerical value.

11. The method of claim 8, wherein the request for storage allocation is generated according to a first requesting application, wherein the first existing logical unit and the second existing logical unit include non-available storage space already being used for storage in connection with storage allocation for a second requesting application.

12. A non-transitory computer usable medium storing computer readable program code having a program for selecting a logical unit for a requested application storage allocation comprising:
    computer readable program code for receiving a request for storage allocation having a plurality of storage attributes including a capacity and at least one criterion selected from the group consisting of performance and availability criteria;
    computer readable program code for identifying whether a first existing logical unit in a storage array exists having at least one designated storage characteristics that satisfies the at least one criterion and having an available storage space that satisfies the capacity; and
    computer readable program code for, where the first existing logical unit does not exist, identifying a second existing logical unit in the storage array that has the available storage space that satisfies the capacity and is modifiable to satisfy the at least one criterion, and modifying the second existing local unit to satisfy the at least one criterion; and
    computer readable program code for allocating at least a portion of the identified first or second existing logical unit for storage associated with the request.

13. The non-transitory computer usable medium of claim 12 further comprising:
    computer readable program code associating the at least one criterion with the allocated logical unit.

14. The non-transitory computer usable medium of claim 13 further comprising:
    computer readable program code for monitoring the allocated logical unit to confirm that its actual storage characteristic satisfy the at least one criterion.

15. The non-transitory computer usable medium of claim 14 further comprising:
    computer readable program code for adjusting the at least one designated storage characteristic of the allocated logical unit if the actual storage characteristic does not meet the at least one criterion.

16. The non-transitory computer usable medium of claim 13 further comprising:
    computer readable program code for modifying the at least one criterion associated with the allocated logical unit.

17. The non-transitory computer usable medium of claim 16 further comprising:
    if the allocated logical unit does not satisfy the at least one criterion, adjusting the at least one designated storage characteristics of the allocated logical unit.

18. The non-transitory computer usable medium of claim 12, wherein the request for storage allocation is created according to a first requesting application, wherein the first existing logical unit and the second existing logical unit include non-available storage space already being used for storage in connection with storage allocation for a second requesting application.

* * * * *